United States Patent
Shigapov

(10) Patent No.: US 8,572,219 B1
(45) Date of Patent: Oct. 29, 2013

(54) SELECTIVE TUNNELING BASED ON A CLIENT CONFIGURATION AND REQUEST

(75) Inventor: Andrey Shigapov, Fremont, CA (US)

(73) Assignee: F5 Networks, Inc., Seattle, WA (US)

( * ) Notice: Subject to any disclaimer, the term of this patent is extended or adjusted under 35 U.S.C. 154(b) by 1247 days.

(21) Appl. No.: 11/386,178

(22) Filed: Mar. 22, 2006

Related U.S. Application Data

(60) Provisional application No. 60/778,357, filed on Mar. 2, 2006.

(51) Int. Cl.
  *G06F 15/177* (2006.01)
  *G06F 15/16* (2006.01)
  *G06F 21/00* (2013.01)
  *H04M 3/00* (2006.01)

(52) U.S. Cl.
  USPC .............. 709/221; 709/229; 705/50; 455/419

(58) Field of Classification Search
  USPC .......... 709/219–225; 380/255–256, 270–274; 713/150–154, 160–163; 726/11–15
  See application file for complete search history.

(56) References Cited

U.S. PATENT DOCUMENTS

| | | | |
|---|---|---|---|
| 5,319,638 A | | 6/1994 | Lin |
| 5,825,890 A | | 10/1998 | Elgamal et al. |
| 6,052,785 A | | 4/2000 | Lin et al. |
| 6,061,454 A | | 5/2000 | Malik et al. |
| 6,223,287 B1 | | 4/2001 | Douglas et al. |
| 6,244,958 B1 | * | 6/2001 | Acres ............................. 463/26 |
| 6,367,009 B1 | | 4/2002 | Davis et al. |
| 6,584,567 B1 | | 6/2003 | Bellwood et al. |
| 6,643,701 B1 | | 11/2003 | Aziz et al. |
| 6,674,717 B1 | | 1/2004 | Duong-van et al. |
| 6,681,327 B1 | | 1/2004 | Jardin |
| 6,718,388 B1 | | 4/2004 | Yarborough et al. |
| 7,263,558 B1 | * | 8/2007 | Khirman et al. ............... 709/229 |
| 8,009,566 B2 | | 8/2011 | Zuk et al. |
| 8,024,488 B2 | * | 9/2011 | Salowey et al. .................... 710/5 |
| 2002/0099937 A1 | * | 7/2002 | Tuomenoksa ................. 713/153 |
| 2003/0227554 A1 | * | 12/2003 | Kazami et al. ............. 348/231.3 |
| 2005/0063303 A1 | | 3/2005 | Samuels et al. |

(Continued)

OTHER PUBLICATIONS

Apple iTunes, "Download iTunes," www(dot)apple(dot)com/itunes/download/ as cached by WebArchive Feb. 3, 2005.*

(Continued)

*Primary Examiner* — Evans Desrosiers
(74) *Attorney, Agent, or Firm* — Frommer Lawrence & Haug LLP; Jamie L. Wiegand

(57) ABSTRACT

A system, apparatus, and method are directed to network communication over a tunnel by downloading selective tunneling (STM) components into memory of a client device. The STM components selectively employ tunneling to route network traffic to a requested resource. The STM components may include a network API, application, and a tunnel manager that have been modified based in part on a client configuration. As a network request is made it is evaluated against the client configuration. If the connection is to be tunneled, a network tunnel is selectively established. If the client configuration and/or the request indicate that the request is to be un-tunneled, an un-tunneled network connection may instead be established. The client configuration may also indicate that the client device is to be redirected to enable remediation. When the application component is closed, or otherwise terminated, the client's memory may be purged of the loaded STM components.

22 Claims, 7 Drawing Sheets

(56) References Cited

U.S. PATENT DOCUMENTS

| | | | |
|---|---|---|---|
| 2005/0074007 A1 | 4/2005 | Samuels et al. | |
| 2005/0079863 A1* | 4/2005 | Macaluso | 455/419 |
| 2005/0108420 A1 | 5/2005 | Brown et al. | |
| 2005/0120231 A1* | 6/2005 | Harada et al. | 713/189 |
| 2005/0187979 A1 | 8/2005 | Christensen et al. | |
| 2005/0265235 A1 | 12/2005 | Accapadi et al. | |
| 2006/0005240 A1 | 1/2006 | Sundarrajan et al. | |
| 2006/0265689 A1 | 11/2006 | Kuznetsov et al. | |
| 2007/0157285 A1* | 7/2007 | Frank et al. | 725/138 |
| 2008/0253366 A1 | 10/2008 | Zuk et al. | |

OTHER PUBLICATIONS

Cisco Systems, "Cisco Delivers Adaptive Threat Defense Across Security Product Portfolio," Cisco News Release, http://newsroom.cisco.com/dlls/2005/prod_021505b.html?CMP=AF17154, Feb. 15, 2005.
AARNet: Network: Large MTU: Programming (www.aarnet.edu.au.engineering/networkdesign/mtu/programming.html), Dec. 9, 2005.
TCP/IP options for high-performance data transmission (Builder.com.com/5100-6372-1050878.html), Dec. 9, 2005.
Wireless/Networking (compnetworking.about.com/od/tcpip/l/bldef_nagle.htm), Dec. 6, 2005.
TCP. Section—Linux Programmer's Manual (7) (www.fifi.org/cgi-bin/man2html/usr/share/man/man7/tcp.7.gz), Dec. 9, 2005.
RFC 896—Congestion control in IP/TCP Internetworks (www.faqs.org/rfcs/rfc896.html), Jan. 6, 1984.
RSA Laboratories. PKCS #1 v2.0: RSA Cryptography Standard, Oct. 1, 1998.
Berners-Lee et al, RFC 1945, Hypertext Transfer Protocol—HTTP-P/1.0, Network Working Group, May 1996.
Dierks and Allen, RFC 2246, The TLS Protocol Version 1.0, Network Working Group, Jan. 1999.
Fielding et al., RFC 2616, Hypertext Transfer Protocol—HTTP/1.1, Network Working Group, Jun. 1999.
Kessler, RFC 1739, A Primer on Internet and TCP/IP Tools, Network Working Group, Dec. 1994.
Netscape Communications Corp., "Secure Sockets Layer (SSL) version 3", Mar. 1996.
Paxson, RFC 2525, Known TCP Implementation Problems, Network Working Group, Mar. 1999.
Rescoria, "SSL and TLS—Designing and Building Secure Systems" pp. 1-46, Mar. 2001.
Nagle's Algorithm (Searchnetworking.techtarget.com/sdefinition/0..sid7gci754347.00.html), Dec. 6, 2005.
The OpenSSL Project.
HTTP/1.1 and Nagle's Algorithm (w3.org), Dec. 6, 2005.

* cited by examiner

SELECTIVE TUNNELING BASED ON A CLIENT CONFIGURATION AND REQUEST

CROSS-REFERENCE TO RELATED APPLICATIONS

The present application claims benefit of provisional application Ser. No. 60/778,357 entitled "Selective Tunneling Based On A Client Configuration And Request," filed on Mar. 2, 2006, the benefit of the earlier filing date of which is hereby claimed under 35 U.S.C. §119 (e) and 37C.F.R. §1.78, and which is further incorporated by reference.

BACKGROUND OF THE INVENTION

This invention relates generally to network communications, and more particularly but not exclusively, to managing network communications by selectively employing tunneled network connections based, in part, on a client configuration and the request.

Many of today's enterprises regularly use the Internet to remotely connect employees, business partners, and, even customers to hosted resources. The benefits are significant, but not without risk. Unfortunately, the risks are growing.

In response to the growing risks of attacks, potentials for legal suits, federal compliance requirements, and so forth, enterprises have spent millions to protect their digital resources. In particular, many enterprises have recognized that the first security barrier to their information systems is a strong security perimeter. While a security perimeter is designed to restrict improper flow of network traffic between networks, they may also block desirable network traffic flows. This may be particularly true where a client device resides on one side of the security perimeter and a resource server, or another client resides on the other side of the security perimeter.

Some traditional solutions that have been implemented to enable communications across the security perimeter include Virtual Private Networks (VPNs), proxy servers, and reverse proxy servers. However, each of these solutions also bring with them problems that may limit their usefulness to an enterprise. For example, while traditional VPNs enable secure communications across the security perimeter, they often also require VPN software to be pre-installed on the remote client. This may require access rights or skills that an end-user of the device may not possess.

While traditional proxy servers may enable some communications through the security perimeter, many of today's applications and protocols do support the use of proxy servers. For example, in the case of some browsers, some active components embedded within a web page may not properly function through the security perimeter using a proxy server. Reverse proxy servers may also create complications for communications through the security perimeter. For example, many implementations of reverse proxy servers may rewrite protocols and/or web content before sending the content through the security perimeter to the client. However, web pages that include client side scripts, active components, or the like, may be virtually impossible to be rewritten and thereby limiting the use of reverse proxy servers. Therefore, there is a need in the industry for an improved mechanism to enable communications across a security perimeter. Thus, it is with respect to these considerations and others that the present invention has been made.

BRIEF DESCRIPTION OF THE DRAWINGS

Non-limiting and non-exhaustive embodiments of the invention are described with reference to the following drawings. In the drawings, like reference numerals refer to like parts throughout the various figures unless otherwise specified.

For a better understanding of the invention, reference will be made to the following Detailed Description of the Invention, which is to be read in association with the accompanying drawings, wherein.

DETAILED DESCRIPTION OF THE INVENTION

Figure 1:
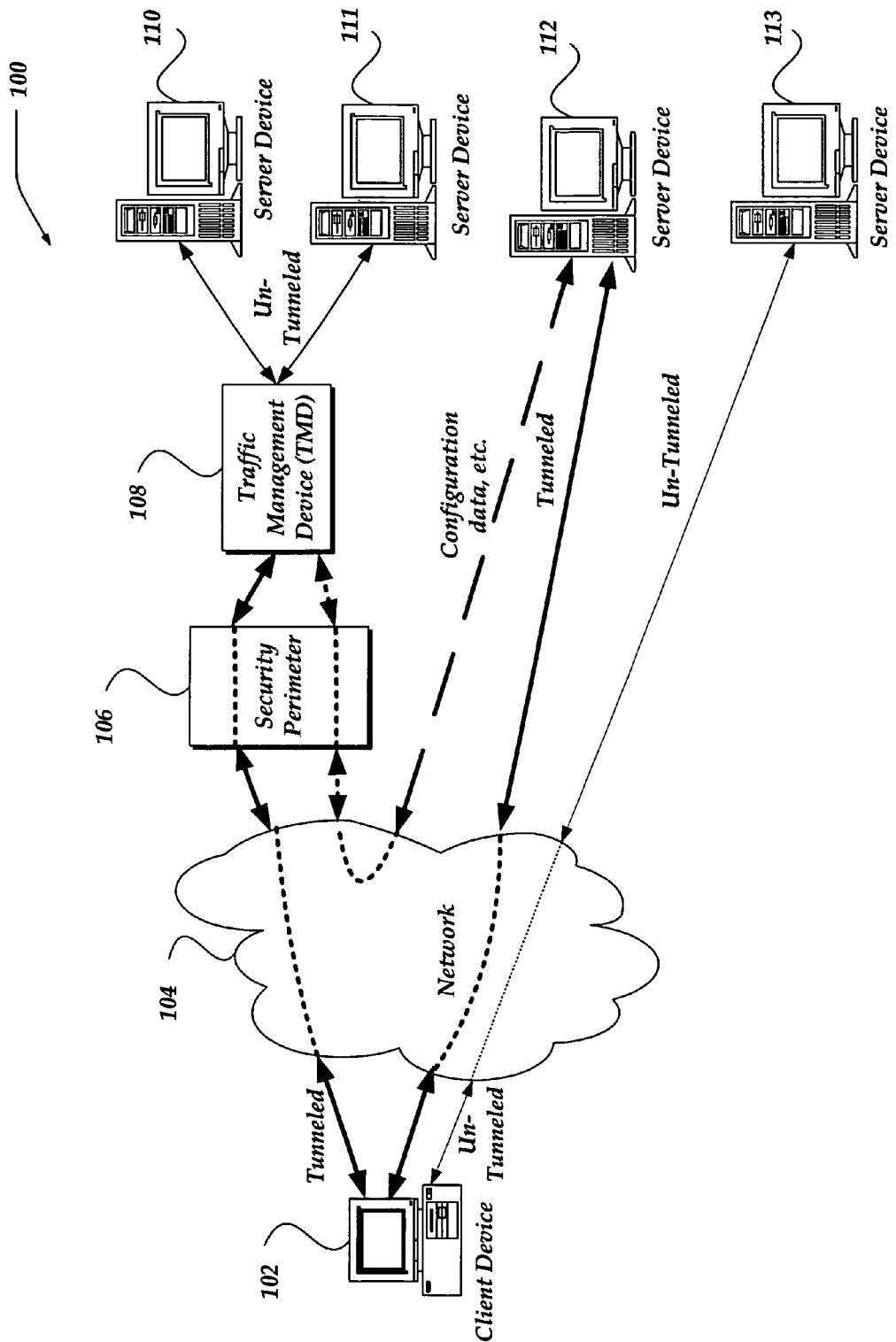
FIG. 1 shows a functional block diagram illustrating one embodiment of an environment for practicing the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, a "tunnel" or "tunneled connection" is a network mechanism that provides for the encapsulation of network packets or frames at a same or lower layer protocol of the Open Systems Interconnection (OSI) network stack. Tunneling may be employed to take packets or frames from one network system and place (or encapsulate) them inside of frames from another network system. Examples of tunneling protocols include, but are not limited to IP tunneling, L2TP, VPNs, IPSec, GRE, MBone, and SSL.

As used herein a "network connection" is a collection of links and/or software elements that enable a computing device to communicate with another computing device over a network. One such network connection may be a TCP connection. TCP connections are virtual connections between two network nodes, and are typically established through a TCP handshake protocol. The TCP protocol is described in more detail in Request for Comments 793, which is available at http://www.ietforg/rfc/rfc0793.txt?number=793.

A security enhancing resource is any resource that is configured to provide a change in a client's security configuration that is directed towards increasing or improving the level of security of the client device. In one embodiment, the security enhancing resource is an application, script, macro, or the like. The security enhancing resource may download patches, applications, or the like, or make changes in selected security options within the client device.

A security level of a computing device is a combination of a hierarchical security classification and a set of security categories that represent a degree of protection against exposure of the computing device to unauthorized access or use.

Briefly stated, the invention is directed towards a system, apparatus, and method for managing network communications by selectively employing tunneled connections based, in part, on at least one attribute of a configuration of the client device and a request. A client device may initially request a network connection to a network device. In one embodiment, the request for a network connection may result in an initial authentication of the client device, using, for example, a digital certificate, a password, or the like. A configuration of the client device may then be determined. In one embodiment, the client configuration may be detected prior to authentication of the client device. The detected client configuration may include various attributes including attributes associated with a security level of the client device, which applications are on the client device, attributes associated with an operating system, or software patch level, as well as environmental attributes about the client device, including whether the client device is a laptop, a personal computer, a kiosk, a mobile device, or the like. In one embodiment, the security level may be based, at least in part, on what antivirus products are active on the client device, what encryption the client device is capable of employing, an operating system configuration, or the like.

Based, at least in part, on at least one attribute of the detected client configuration, selective tunneling management (STM) components are dynamically modified. Such STM components may include a modified application such as a browser, an email client, an instant messaging client, or other modified applications that may request a network resource. In another embodiment, the STM components may include a modified network Application Programming Interface (API), such as a WINSOCK API, UNIX sockets API, or the like. The STM components may further include a tunnel manager. The dynamically modified STM components are then downloaded to the client device. The STM components are configured to be dynamically loaded into memory of the client device, and to selectively tunnel network connections based, at least in part, on the request for a network connection and the at least one attribute of the detected client configuration.

When an application requests a network connection, one of the STM components provides the request to the tunnel manager S™ component. For example, in one embodiment, if a modified application is loaded into memory, then the modified application may provide the request to the tunnel manager. In another embodiment, if the modified network API is loaded into memory, then it may provide the request to the tunnel manager. In any event, upon receipt of the request, the tunnel manager evaluates the request to determine whether the request is to a network resource that is to employ a tunneled connection based on the at least one attribute of the detected client's configuration. In one embodiment, the tunnel manager may determine that the security level of the client device is below a predetermined threshold level of protection. The request for a tunneled connection may therefore, be denied, or redirected to a security enhancing resource, or the like. In one embodiment, the client device may be denied access to other resources. The security enhancing resource may be enabled to perform remediation to attempt to improve the security level of the client device, by providing antivirus software, a patch update, a credential, an updated application, or the like.

Determination of whether to tunnel the request may also be based on information associated with the request, including, but not limited to an IP address, a TCP port number, a server type, an application on the client device initiating the request, an application to receive the request, or the like.

If the connection is to be tunneled, a network tunnel is selectively established and communications between the client device and requested resource is enabled. If the request is to be un-tunneled, an un-tunneled network connection may instead be established. When the application is closed, or otherwise terminated, the client's memory may be purged of the STM components.

Illustrative Operating Environment

FIG. 1 shows a functional block diagram illustrating one embodiment of an environment for practicing the invention. However, not all of these components may be required to practice the invention, and variations in the arrangement and type of the components may be made without departing from the spirit or scope of the invention.

As shown in the figure, system 100 includes client device 103, network 104, security perimeter 106, traffic management device (TMD) 108, and server devices 110-113. Network 104 enables communication between client device 103 and security perimeter 106. Network 104 also enables communication between client device 103 and server devices 113-113. TMD 108 is in communication with security perimeter 106 and server devices 110-111.

Client device 103 may include virtually any computing device capable of communicating over a network to send and receive information, including web requests for information from a server, messages to another computing device, or the like. The set of such devices may include devices that typically connect using a wired communications medium such as personal computers, multiprocessor systems, microprocessor-based or programmable consumer electronics, network PCs, or the like. The set of such devices may also include devices that typically connect using a wireless communications medium such as cell phones, smart phones, radio frequency (RF) devices, infrared (IR) devices, integrated devices combining one or more of the preceding devices, or virtually any mobile device. Similarly, client device 103 may be any device that is capable of connecting using a wired or wireless communication medium such as a PDA, POCKET PC, wearable computer, and any other device that is equipped to communicate over a wired and/or wireless communication medium.

Client device 103 may further include a client application that is configured to manage various actions. Moreover, client device 103 may also include a web browser application that is configured to enable an end-user to interact with other devices and applications over network 104.

In one embodiment, client device 103 may be configured to access a network device, and receive selective tunneling management (STM) components. In one embodiment, the STM components may be dynamically loaded within memory of client device 103. Client device 103 may then employ the STM components to selectively tunnel communications over network 104 to a network device, based at least in part on at least one attribute of the client configuration and the request. In one embodiment, when the communications is terminated, such as when an application associated with the tunnel is closed, or the like, the STM components may be purged from the memory of client device 103.

As shown in the figure, client device 103 may selectively tunnel a communications to a server device, such as server device 113 that is not protected by security perimeter 106, as well as a server device that is protected by security perimeter 106.

Network 104 is configured to couple one network device with other network devices. Network 104 is enabled to employ any form of computer readable media for communicating information from one electronic device to another. Also, network 104 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 104 may further employ a plurality of wireless access technologies including, but not limited to, 2nd (2G), 3rd (3G) generation radio access for cellular systems, Wireless-LAN, Wireless Router (WR) mesh, or the like. Access technologies such as 2G, 3G, and future access networks may enable wide area coverage for network devices, with various degrees of mobility. For example, network 104 may enable a radio connection through a radio network access such as Global System for Mobil communication (GSM), General Packet Radio Services (GPRS), Enhanced Data GSM Environment (EDGE), Wideband Code Division Multiple Access (WCDMA), or the like.

Furthermore, remote computers and other related electronic devices could be remotely connected to either LANs or WANs via a modem and temporary telephone link. In essence, network 104 includes any communication method by which information may travel between one network device and another network device.

Additionally, network 104 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, or the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

Security perimeter 106 is an electronic boundary substantially surrounding one or more computing assets, and is designed to prevent unauthorized access to a network, or other computing asset. Security perimeter may be implemented through a single network device, such as a switch, router, bridge, server, or the like, or through a variety of network devices. Such network devices may also include applications arranged to inspect network traffic and perform filtering decisions including whether the network traffic may flow through the security perimeter. One embodiment of a network device that includes a filtering application is a firewall. However, the invention is not constrained to firewalls, and packet filters, gateways, proxy servers, or the like may also be included. Devices that may operate at least as part of security perimeter 106 include switches, personal computers, desktop computers, multiprocessor systems, microprocessor-based or programmable consumer electronics, network PCs, servers, routers, bridges, network appliances, or the like.

TMD 108 includes virtually any device that manages network traffic. Such devices include, for example, routers, proxies, firewalls, load balancers, cache devices, gateways, devices that perform network address translation (NATs), port translations, sequence translations, or the like, any combination of the preceding devices, and the like. Thus, in one embodiment, TMD 108 may inspect incoming network packets, and may perform an address translation, port translation, a packet sequence translation, and the like, and route the network packet based, at least in part, on the packet inspection.

In one embodiment, TMD 108 may perform a packet-by-packet content switching decision for client-side requests. Thus, TMD 108 may, for example, control the flow of data packets delivered to and forwarded from a server, such as server devices 110-111. TMD 108 may direct a request to a particular server based on network traffic, network topology, capacity of a server, content requested, and a host of other traffic distribution mechanisms. TMD 108 may receive packets from and transmit packets to network 104, the Internet, an intranet, or a local area network accessible through another network. TMD 108 may recognize packets that are part of the same communication, flow, and/or stream and may perform special processing on such packets, such as directing them to the same server so that state information is maintained. TMD 108 also may support a wide variety of network applications such as web browsing, email, telephony, streaming multimedia and other traffic that is sent in packets.

TMD 108 may communicate with server devices 110-111 and/or through security perimeter 106 to client device 103 and/or server device 113 using any of a variety of network communication protocols, including TCP/IP, HTTP, as well as any of a variety of other connection-oriented protocols or the like. TMD 108 may also employ any of a variety of secure communication channels, including, but not limited to SSL/TLS, Point-to-Point Tunneling Protocol (PPTP), Layer 2 Tunneling Protocol (L2TP), Layer 2 Forwarding (L2F), IP SECurity (IPSec) VPNs, SSL VPNs, or the like.

As shown in the figure, TMD 108 may receive selectively tunneled communications from client device 103 through security perimeter 106. TMD 108 may then select to provide the communications to one of server devices 110-111 based in part on at least one attribute of the client configuration and the request. In one embodiment, TMD 108 may also redirect the request to a security enhancing resource (not shown) for remediation of client device 103. Such redirection may be based, for example, on at least one attribute of the client's configuration being below a predetermined threshold level. The security enhancing resource may be a server device (not shown) or a resource within one or more of server devices 110-113. In one embodiment, TMD 108 may also deny a request from client device 103 based in part on the at least one attribute of the client configuration and request.

In one embodiment, where the client's request for a tunnel is to a server device that is not protected by security perimeter 106, TMD 108 may communicate with the server device to provide information useable to enable the establishment of the tunnel. For example, where client device 103 requests a tunneled connection with server device 113, TMD 108 and server device 113 may share such information as the client's configuration attributes, certificates, or the like, to determine whether to establish the tunneled connection, redirect the request, or to deny the request.

In one embodiment, TMD 108 may also be employed to provide one or more STM components to client device 103 for use in selectively tunneling a network connection. TMD 108 may further modify the STM components based in part on at least one attribute of the client's configuration.

TMD 108 may be implemented using one or more personal computers, servers, multiprocessor systems, microprocessor-based or programmable consumer electronics, network PCs, radio frequency (RF) devices, infrared (IR) devices, integrated devices combining one or more of the preceding devices, and the like. Such devices may be implemented solely in hardware or in hardware and software. For example, such devices may include some application specific integrated circuits (ASICs) coupled to one or more microprocessors. The ASICs may be used to provide a high-speed switch fabric while the microprocessors may perform higher layer processing of packets. The BIG-IP® family of traffic managers, by F5 Networks of Seattle, Wash., are examples of TMDs. The FirePass® SSL VPN appliances by F5 Networks of Seattle, Wash. are other examples of TMDs.

Server devices 110-113 are configured to operate as website servers. However, server devices 110-113 are not limited to web servers, and may also operate a messaging server, a File Transfer Protocol (FTP) server, a database server, content server, and the like. Additionally, each of server devices 110-113 may be configured to perform a different operation. Thus, for example, server device 110 may be configured as a messaging server, while server device 111, server device 113, or even server device 113 may be configured as a database server, or the like. Moreover, while server devices 110-113 may operate as other than a website, they may still be enabled to receive an HTTP communication.

Devices that may operate as server devices 110-113 include personal computers, desktop computers, multiprocessor systems, microprocessor-based or programmable consumer electronics, network PCs, servers, and the like.

Illustrative Client Device

Figure 2:
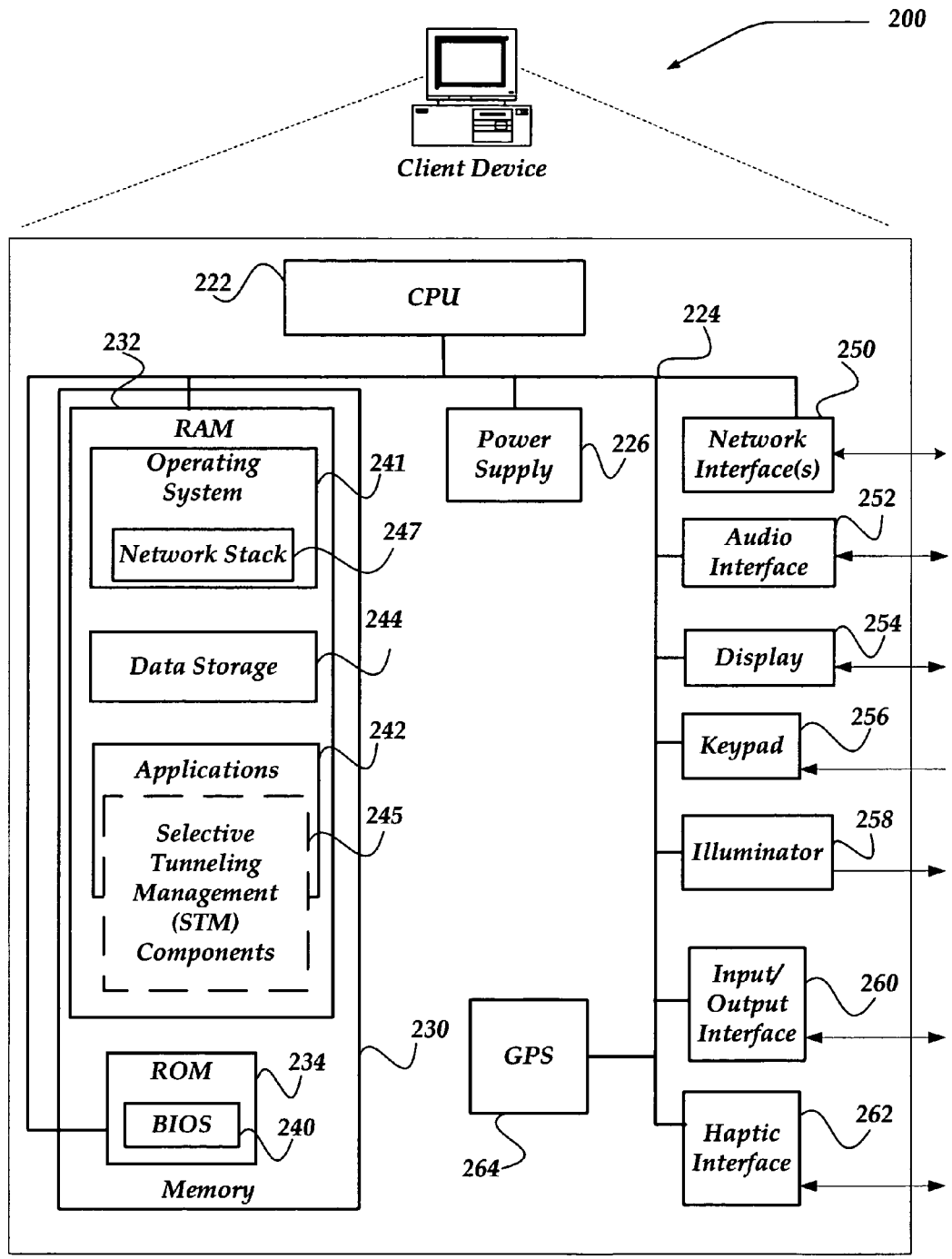
FIG. 2 shows one embodiment of a client device that may be included in a system implementing the invention.

FIG. 2 shows one embodiment of client device 200 that may be included in a system implementing the invention. Generally, client device 200 may comprise any personal electronic device. Oftentimes, electronic devices will be capable of personal communication by connecting to one or more wired and/or wireless networks, connecting to multiple nodes of a single wired and/or wireless network, communicating over one or more channels to one or more networks, or otherwise engaging in one or more communication sessions. Client device 200 may, for example, comprise electronic devices such as Personal Digital Assistants (PDAs), handheld computers, personal computers, multiprocessor systems, microprocessor-based or programmable consumer electronics, network PCs, wearable computers, or the like. Client device 200 may also comprise a server device.

Client device 200 may include many more or less components than those shown in FIG. 2. However, the components shown are sufficient to disclose an illustrative embodiment for practicing the present invention. As shown in the figure, client device 200 includes a processing unit 222 in communication with a mass memory 230 via a bus 224.

Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or the like. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Operating system 241 may also include network stack 247. Network stack 247 represents a suite of components that enable various networking communications. Network stack 247 is sometimes known as a TCP/IP stack, a TCP/IP protocol suite, or a networking protocol stack. Network stack 247 is configured to manage various networking communication protocols within layers 3 and 4 (e.g., the network layer, and the transport layer) of the seven-layer protocol stack as defined by the ISO-OSI (International Standards Organization-Open Systems Interconnection) framework. For example, network stack 247 may include components configured to manage TCP, UDP, RTP, SCTP, SPX, ATP communications, or the like. Network stack 247 may also include components configured to manage IP, ICMP, ARP, PIPX, BGP, OSPF, RIP, IGRP, RARP, or X.25 communications, or the like.

Memory 230 further includes one or more data storage 244, which can be utilized by client device 200 to store, among other things, applications 242 and/or other data. For example, data storage 244 may also be employed to store information that describes various capabilities of client device 200. The information may then be provided to another device based on any of a variety of events, including being sent as part of a header during a communication, sent upon request, or the like.

Applications 242 may include computer executable instructions which, when executed by client device 200, transmit, receive, and/or otherwise process messages (e.g., SMS, MMS, IM, email, and/or other messages), audio, video, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, and so forth. In addition, mass memory 230 stores STM components 245.

STM components 245 are described in more detail below in conjunction with FIG. 3. Briefly, however, STM components 245 includes components directed towards detecting a request for a network connection and determining, based in part on at least one attribute of the client configuration and a request, to selectively establish a network tunnel useable in providing a secure communications. STM components 245 may include at least one component that is modified based in part on the at least one attribute of the client configuration. STM components 245 may also include components that are modified to enable interactions between components within the STM components 245. Hence, STM components 245 are illustrated as a dotted box, with a partial overlap with applications 242.

Figure 3:
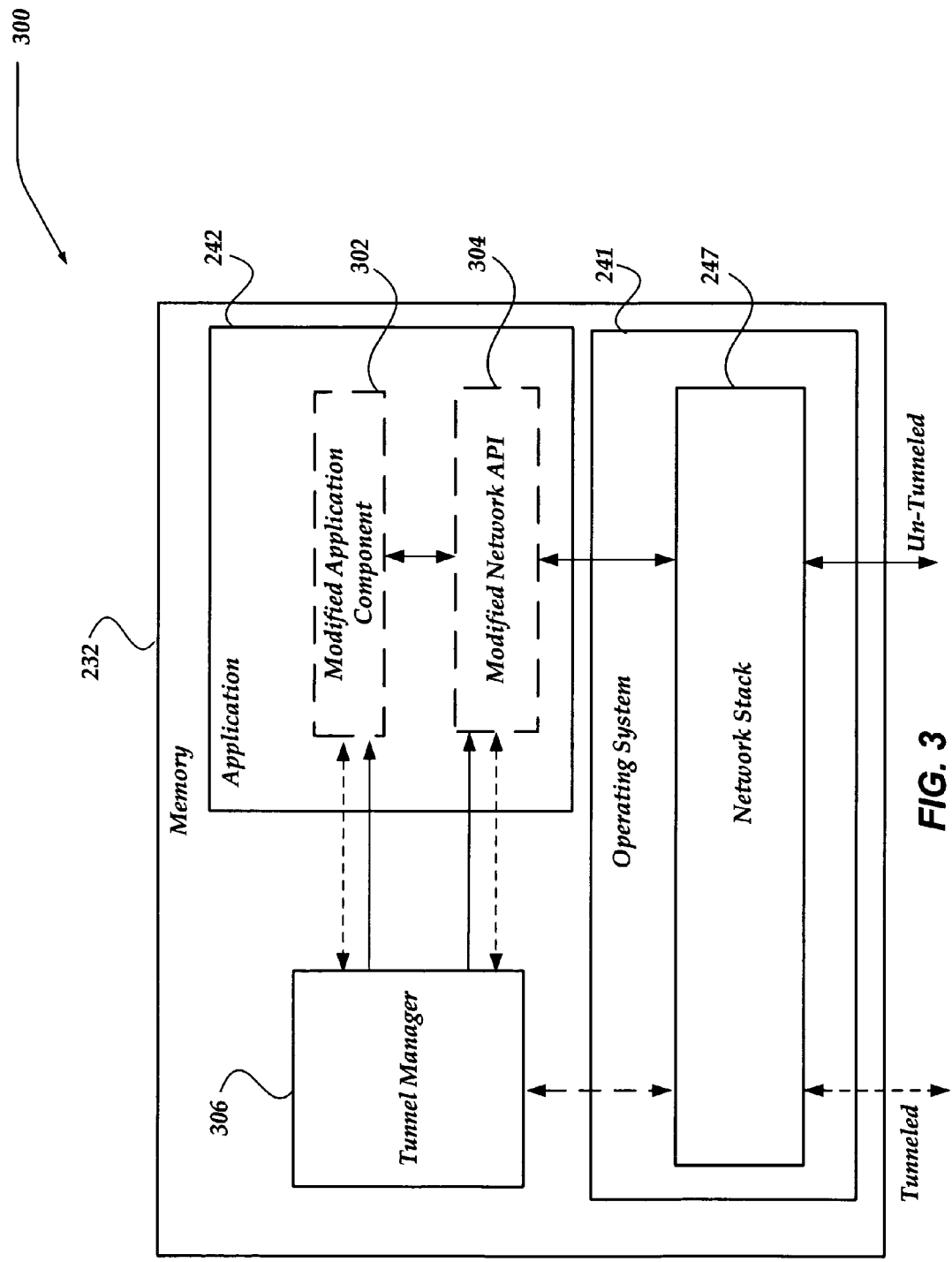
FIG. 3 shows a functional block diagram illustrating one embodiment of modified selective tunneling management (STM) components within memory of a client device.

FIG. 3 shows a functional block diagram illustrating one embodiment of modified STM components within memory of a client device. Memory Components 300 may include many more or less components than those shown in FIG. 3. However, the components shown are sufficient to disclose an illustrative embodiment for practicing the present invention. As shown in the figure, memory components 300 include operating system 241, applications 242, and tunnel manager 306. Operating system 241 includes network stack 247. Applications 242 include modified application component 302 and modified network API 304. As noted above, components with like reference numbers to those in FIG. 2 represent like components.

Modified application component 302, modified network API 304, and tunnel manager 306 may be included within STM components 245 of FIG. 2. As illustrated however, one of modified application component 302 or modified network API 304 is an optional component. That is, if modified application component 302 is absent, then the associated application within applications 242 remains unmodified. Similarly, where modified network API 304 is absent, then the associated network API, or the like, within applications 242 remains unmodified. Thus, communications with tunnel manager 306 would occur between the modified component(s).

Modified application component 302 is a modified version of any of a variety of client applications that is configured to request a network connection. Such client applications include, but are not limited to, a browser, a mail client, an Instant Messaging (IM) client, a Voice Over IP (VOIP) client, a Short Message Service (SMS) client, or the like. In one embodiment, one of more of the client applications may be modified to communicate with and to provide its request for the network connection to tunnel manager 306. In one embodiment, modified application component 302 may also be modified to provide its request for the network connection to modified network API 304.

In one embodiment, the modified application component 302 is a binary version of the client application configured to be loaded and executed within client device's memory 232.

Modified network API 304 is a modified version of a network component that is arranged to provide an interface between client applications and network stack 247. Modified network API 304 may receive requests for network connections from modified application component 302 and/or from (un-modified) applications 242.

In one embodiment, modified network API 304 is a socket API, such as Windows Sockets, Unix Sockets, or the like. As such, modified network API 304 may include WINSOCK, WSOCK32, WS2-32, Berkeley sockets, or the like. However, modified network API 304 is a network API component that is modified to communicate with and to provide requests for network connections to tunnel manager 306. Moreover, in one embodiment, modified network API 304 is configured as a binary component that may be loaded and launched within the client device's memory 232.

Tunnel manager 306 is configured to receive requests for network connections and, based on the request and at least one attribute of the client configuration, to selectively enable a tunnel for use with the network connection. In one embodiment, tunnel manager 306 is modified based on at least one attribute of the client configuration. For example, logic within tunnel manager 306 may be modified to make a determination of whether to tunnel a request based on the client configuration.

In one embodiment, tunnel manager 306 may receive a request for a network connection from modified application component 302. Tunnel manager 306 may also receive a request for a network connection from modified network API 304.

Tunnel manager 306 may examine the network request and if the request results in creation of a tunnel, tunnel manager 306 may modify parameters associated with the request. For example, where the request includes a network address, such as an IP address, or the like, tunnel manager 306 may map the network address to a local address for the tunnel. Tunnel manager 306 may then employ another network address to establish the tunneled connection through network stack 247. Tunnel manager 306 may also provide the local address to the application, modified application component 302, and/or modified network API 304.

Tunnel manager 306 may also receive a request for Domain Name (DN) resolution. Tunnel manager 306 based on a DN may map the DN to a local address or ask TMD to perform DN resolution. If the DN is mapped to a local address, tunnel manager 306 may return the local address.

Tunnel manager 306 may selectively tunnel network requests based on the request. For example, a network connection request may be tunneled based on a characteristic of the request, including a DNS name, a IP address, a TCP or UDP port number, a name of a file being requested, an application type, an application initiating the request, an application to receive the request, or the like.

Tunnel manager 306 may further selectively tunnel network requests based on at least one attribute of the client configuration. For example, at least one attribute of the client configuration may indicate that the client's security level is below a threshold. Tunnel manager 306 may then select to redirect the request to a security enhancing resource that may provide remediation services. In another embodiment, tunnel manager 306 may select to deny the request for a tunnel, deny access to a requested resource, or even deny access to some resources and allow access to another resource based on the at least one attribute of the client's configuration.

In one embodiment, where tunnel manager 306 determines that the network request is not to be tunneled, tunnel manager 306 may direct another application, modified application component 302, and/or modified network API 304 to manage the un-tunneled connection for the request. In this embodiment, the other application may then negotiate the un-tunneled connection with network stack 247, rather than with tunnel manager 306. Tunnel manager 306 may, in one embodiment, employ a process such as described below in conjunction with FIG. 6 to perform at least some of its actions.

Illustrative Server Environment

Figure 4:
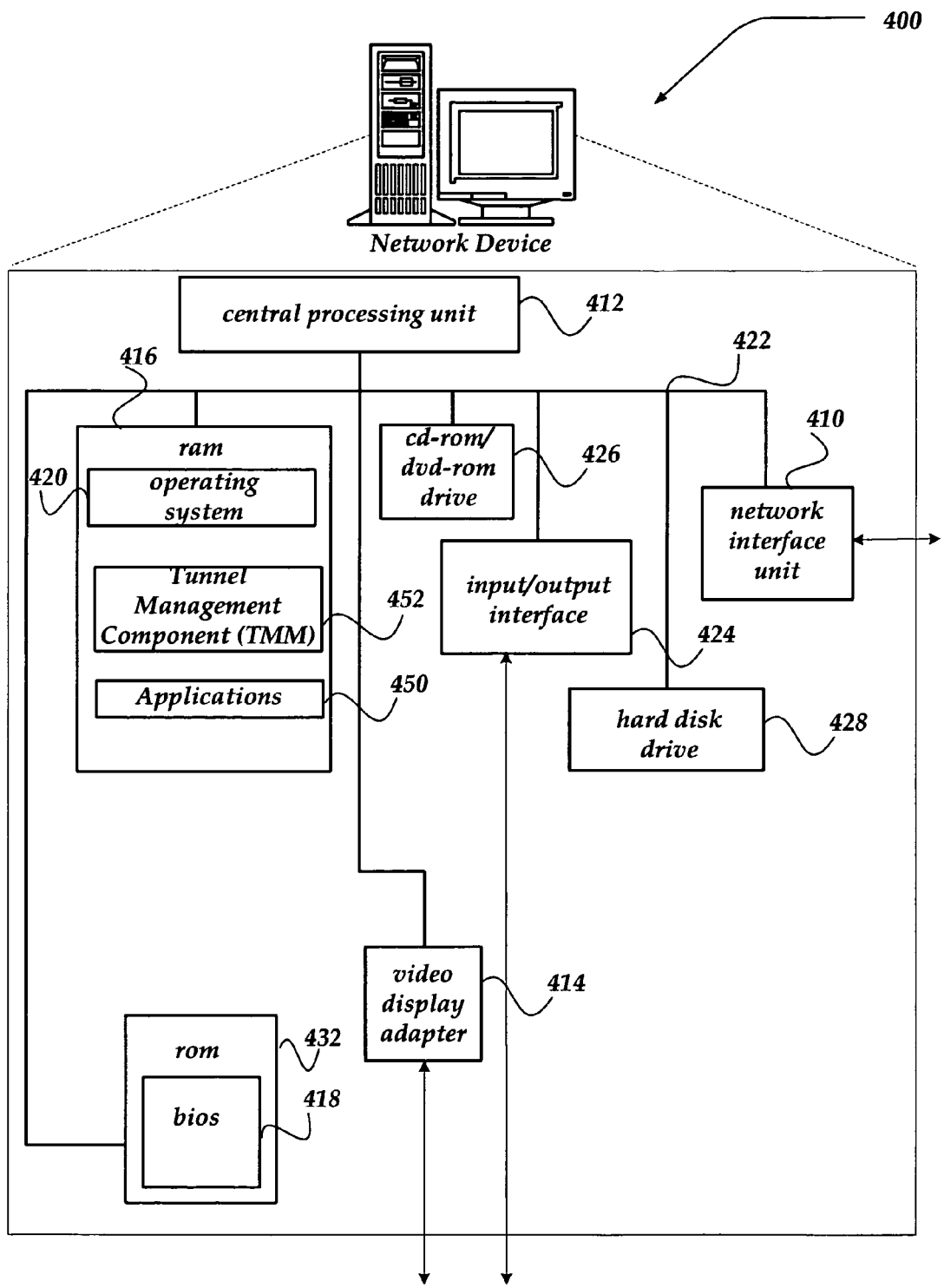
FIG. 4 shows a functional block diagram illustrating one embodiment of a server device that may be included in a system implementing the invention.

FIG. 4 shows one embodiment of a network device, according to one embodiment of the invention. Network device 400 may include many more components than those shown. The components shown, however, are sufficient to disclose an illustrative embodiment for practicing the invention. Network device 400 may represent, for example, TMD 108 of FIG. 1.

Network device 400 includes processing unit 412, video display adapter 414, and a mass memory, all in communication with each other via bus 422. The mass memory generally includes RAM 416, ROM 432, and one or more permanent mass storage devices, such as hard disk drive 428, tape drive, optical drive, and/or floppy disk drive. The mass memory stores operating system 420 for controlling the operation of network device 400. Any general-purpose operating system may be employed. Basic input/output system ("BIOS") 418 is also provided for controlling the low-level operation of network device 400. As illustrated in FIG. 4, network device 400 also can communicate with the Internet, or some other communications network, via network interface unit 410, which is constructed for use with various communication protocols including the TCP/IP protocol. Network interface unit 410 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 450 are loaded into mass memory and run on operating system 420. Examples of application programs may include transcoders, schedulers, calendars, database programs, word processing programs, HTTP programs, customizable user interface programs, IPSec applications, encryption programs, security programs, VPN programs, and so forth. Mass storage may further include applications such as Tunnel Management Module (TMM) 452.

TMM 452 is configured to manage requests for selectively tunneled access to a resource. TMM 452 may manage such requests by providing modified STM components onto a client device, and by further monitoring client requests.

TMM 452 may provide a component, such as an application, java control, program, script, applet, active-X control, and the like, to the client device. TMM 452 may be further configured to receive information from the provided component that includes client configuration attributes. Such client configuration attributes may include, but not be limited to attributes about applications residing on the client device, an operating system, software patch level, type of certificate associated with the client device, encryption capability of the client device, antivirus product(s) installed, or the like. Client configuration attributes may also indicate whether security software is installed, and active, disabled, other security factors, or the like. Client configuration attributes may further include information indicating whether the client device is managed by an enterprise, or not. Client configuration attributes may also include information associated with whether the client device is a laptop, personal computer, kiosk, mobile device, or other type. Such client configuration attributes may be employed to determine a security level associated with the client device, as well as an overall configuration level of the client device. For example, where it is determined that the client device's security products are below a determined configuration level, not active, improperly configured, or the like, the client device may be designated to have a security level below a threshold level.

TMM 452 may also, in one embodiment, modify various STM components based in part on at least one attribute of the detected client configuration. TMM 452 may download onto the client device the STM components to be loaded into memory of the client device. In one embodiment, if the client device's memory has one of the STM components already, the downloaded STM components may replace the pre-existing component in the client device's memory. In one embodiment, TMM 452 may elect not to modify the STM components based on the client configuration, and instead perform selective tunneling decisions at network device 400, rather than at the client device.

TMM 452 may receive requests for a tunneled connection to a resource from the client device. In one embodiment, TMM 452 may evaluate the response and determine whether to allow a tunnel to be established, deny the request, or redirect the request, based in part on at least one attribute of the client configuration and the request. Thus, in one embodiment, TMM 452 may operate to further examine tunnel requests, independent of whether the client device also examined the request.

In one embodiment, where the request is to tunnel a connection to a resource unprotected behind a predetermined security perimeter, TMM 452 may share client configuration attributes, a certificate, or the like, the request, or the like, with the resource. In one embodiment, TMM 452 may determine whether the resource should allow, deny, or redirect the request. In another embodiment, the resource may employ the shared information to determine whether to allow, deny, or redirect the request. TMM 452 may, in one embodiment, employ processes such as described below in conjunction with FIGS. 5 and 7 to perform at least some of its actions.

Network device 400 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion. Moreover, network device 400 may further include applications that support virtually any secure connection, including but not limited to TLS, TTLS, EAP, SSL, IPSec, and the like. Similarly, network device 400 may include applications that support virtually any tunneling mechanism, including but not limited to VPN, PPP, L2TP, and the like.

Network device 400 also includes input/output interface 424 for communicating with external devices, such as a mouse, keyboard, scanner, or other input devices not shown in FIG. 4. Likewise, network device 400 may further include additional mass storage facilities such as CD-ROM/DVD-ROM drive 426 and hard disk drive 428. Hard disk drive 428 may be utilized to store, among other things, application programs, databases, client configuration information, or the like.

In one embodiment, network device 400 includes one or more Application Specific Integrated Circuit (ASIC) chips (not shown) connected to bus 422. In one embodiment, network interface unit 410 may connect to the bus through the ASIC chip. The ASIC chip may include logic that performs some of the functions of network device 400. For example, in one embodiment, the ASIC chip performs a number of packet processing functions, to process incoming data, apply a policy, based on the received data, based on a client configuration, or the like, and based on the policy configure access to a resource, configure a connection between the resource and a client device, or the like. Thus, in one embodiment, the ASIC chip may perform at least some of the actions of TMM 452.

In one embodiment, network device 400 includes one or more field-programmable gate arrays (FPGA) (not shown), instead of, or in addition to, the ASIC chip. A number of functions of the network device can be performed by the ASIC chip, by an FPGA, by CPU 412 with the logic of program code stored in mass memory, or by a combination of the ASIC chip and the CPU.

Generalized Operation

Figure 5:
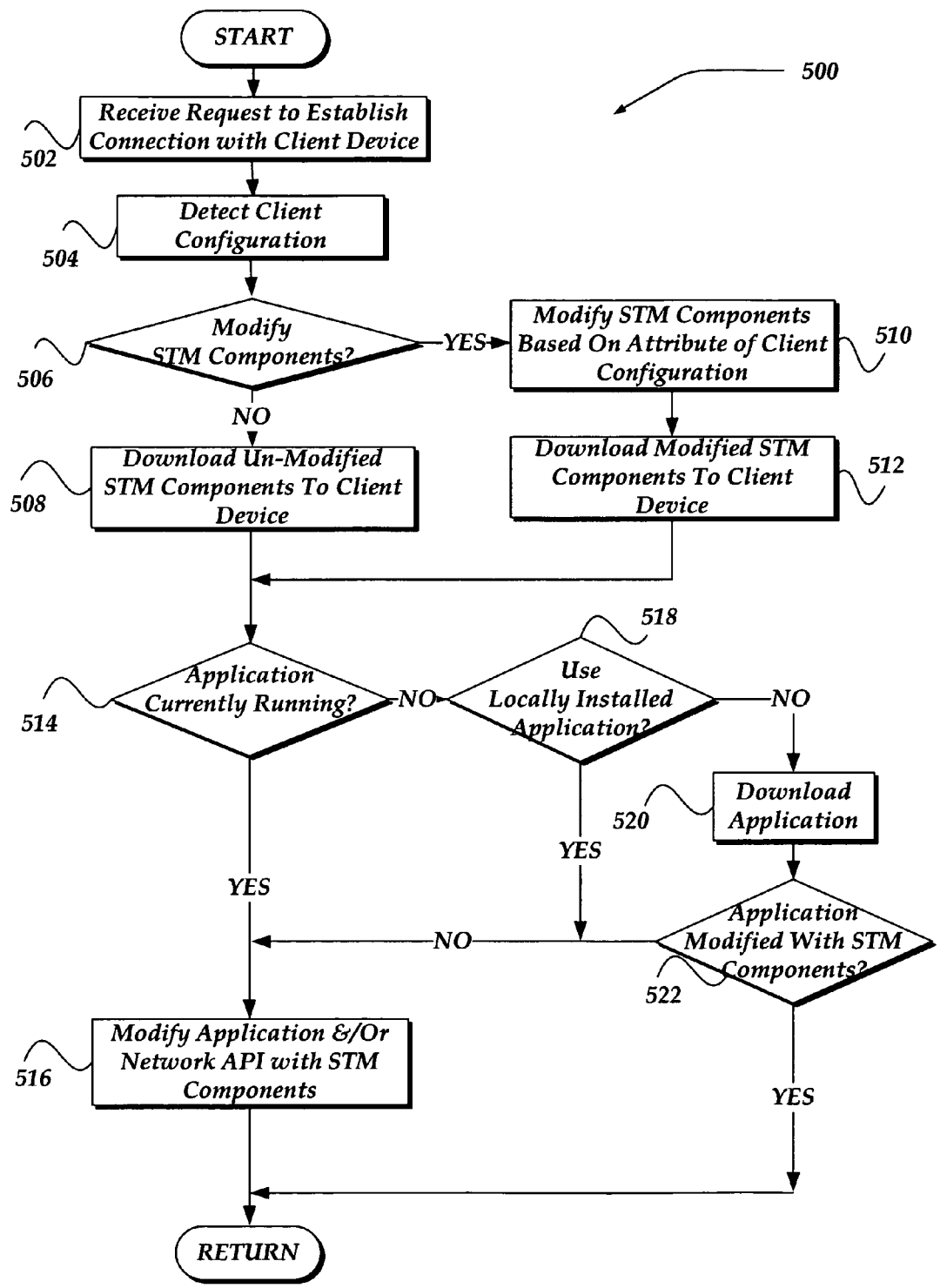
FIG. 5 illustrates a logical flow diagram generally showing one embodiment of an overview process for providing STM components to a client device.

The operation of certain aspects of the invention will now be described with respect to FIGS. 5-7. FIG. 5 illustrates a logical flow diagram generally showing one embodiment of an overview process for providing STM components to a client device. In one embodiment, process 500 of FIG. 5 may be implemented, at least in part, within TMD 108 of FIG. 1.

Process 500 begins, after a start block, at block 502 where a client request for a network connection is received. In one embodiment, at block 502, the client may be authenticated. In one embodiment, the authentication may be performed using a certificate, a user name/password, or the like.

Processing then flows to block 504, where the client's configuration is detected. As described above, in one embodiment, a component may be downloaded onto the client to enable detection of the client's configuration. In another embodiment, one or more commands, inquiries, or the like, may be sent to the client requesting at least one attribute of the client's configuration. In one embodiment, at least some of the client configuration attributes may be employed to determine a security level associated with the client.

Process 500 then continues to decision block 506, where a determination is made whether to modify the STM components based on the at least one attribute of the detected client configuration. If the STM components are to be modified, processing branches to block 510; otherwise processing continues to block 508, where one or more STM components may be downloaded onto the client device, un-modified based in part on at least one attribute of the client configuration. However, one or more of the downloaded STM components may still be modified to enable communications with the tunnel manager S™ component. After block 508, processing flows to decision block 514.

At block 510, however, one or more of the STM components are modified based in part on at least one attribute of the client configuration. Such modifications may, for example, insert tests, conditions, triggers, or the like, that employ the at least one attribute of the client configuration to selectively tunnel, redirect, or even deny a network request. Moreover, it should be noted that various STM components may be available that have been pre-modified based on typical and/or anticipated client configurations. For example, it may be predetermined that at least one attribute of a client configuration may indicate that the client device will have a security level below a threshold. In another pre-determined client configuration it may be anticipated that at least one attribute will indicate that the client device includes an operating system that is deficient of a particular patch level, upgrade, or the like. In another pre-determined client configuration, it may be anticipated that at least one attribute will indicate that the client device is a kiosk, or other client device that is not managed by a particular business, enterprise, or the like. Although, only examples and not to be construed as exhaustive, such pre-determined client configurations (and/or others) may be employed to pre-modify various STM components prior to detecting at least one attribute associated with a configuration of the current client device.

Thus, pre-modified STM components may also be selected at block 510 based on the at least one attribute of the client configuration. Because various STM components may have been pre-modified based on an expected or anticipated at least one attribute of a client configuration, there might not be an exact match between the expected pre-modifications and the at least one detected attribute. Thus, in one embodiment, a pre-modified STM component may be selected that is based on the at least one expected attribute that most closely matches the at least one detected attribute. In another embodiment, however, the invention may also select to dynamically modify various STM components based on the at least one attribute of the detected configuration, and employ the dynamically modified STM components rather than the pre-modified STM components. In still another embodiment, a pre-modified STM component may be selected and further modified based on at least one attribute of the detected client configuration. The one or more attributes used to select the pre-modified component may be the same or different from the at least one attribute upon which the further modification is based. In any event, processing next flows to block 512, where the STM components, including those modified based on the client configuration (or those pre-modified), are downloaded to the client device. Process 500 then flows to decision block 514.

At decision block 514, a determination is made whether an application that is capable of requesting a network connection is currently running within the client device. None or more applications may be currently running in memory on the client device. That is, an email client application may be running, while a browser application, SMS client, or the like, is not currently running within the client device's memory. A running application is any application that is loaded into memory for execution by the client device. A running application need not be actually performing an action and may be idle, but still considered herein to be a running application. Examination of the client device's processes within memory may be performed, as one mechanism, of determining whether an application is running. An examination of the client device's disk drive may also be performed to determine a presence of any applications that are not currently running, but are capable of requesting a network connection. In one embodiment, the client device may be examined for a pre-defined list of applications.

In any event, if an application that is capable of initiating a network request is currently running, processing flows to block 516; otherwise, processing flows to decision block 518. It is noted that decision block 514 may be performed multiple times, to determine a set of applications.

At decision block 518, a determination is made whether an application is identified on the client device that is capable of requesting a network connection (that is not currently running). If such an application is identified, processing flows to block 516.

However, if such an application is not identified, processing flows to block 520, where, in one embodiment, the application may be downloaded to the client device. Downloading the application may be performed, for example, when it is desirable for the client device to employ the application for network communications. Processing next flows to decision block 522 where a determination is made whether the downloaded application includes the STM components. If so, processing returns to a calling process to perform other actions. In one embodiment, process 500 may also loop back to decision block 518 to determine whether another application is to be modified. If, however, at decision block 522, the downloaded application does not include the STM components, processing flows to block 516.

At block 516, the application and/or network API are dynamically modified with the STM components. In one embodiment, the application and/or network API are dynamically modified by replacing processes within the memory of the client device with the STM components. In addition, the tunnel manager may also be loaded and launched within the memory of the client device. Processing then returns to the calling process to perform other actions. In one embodiment, process 500 may also loop back to decision block 514 to determine whether another application is to be modified.

Figure 6:
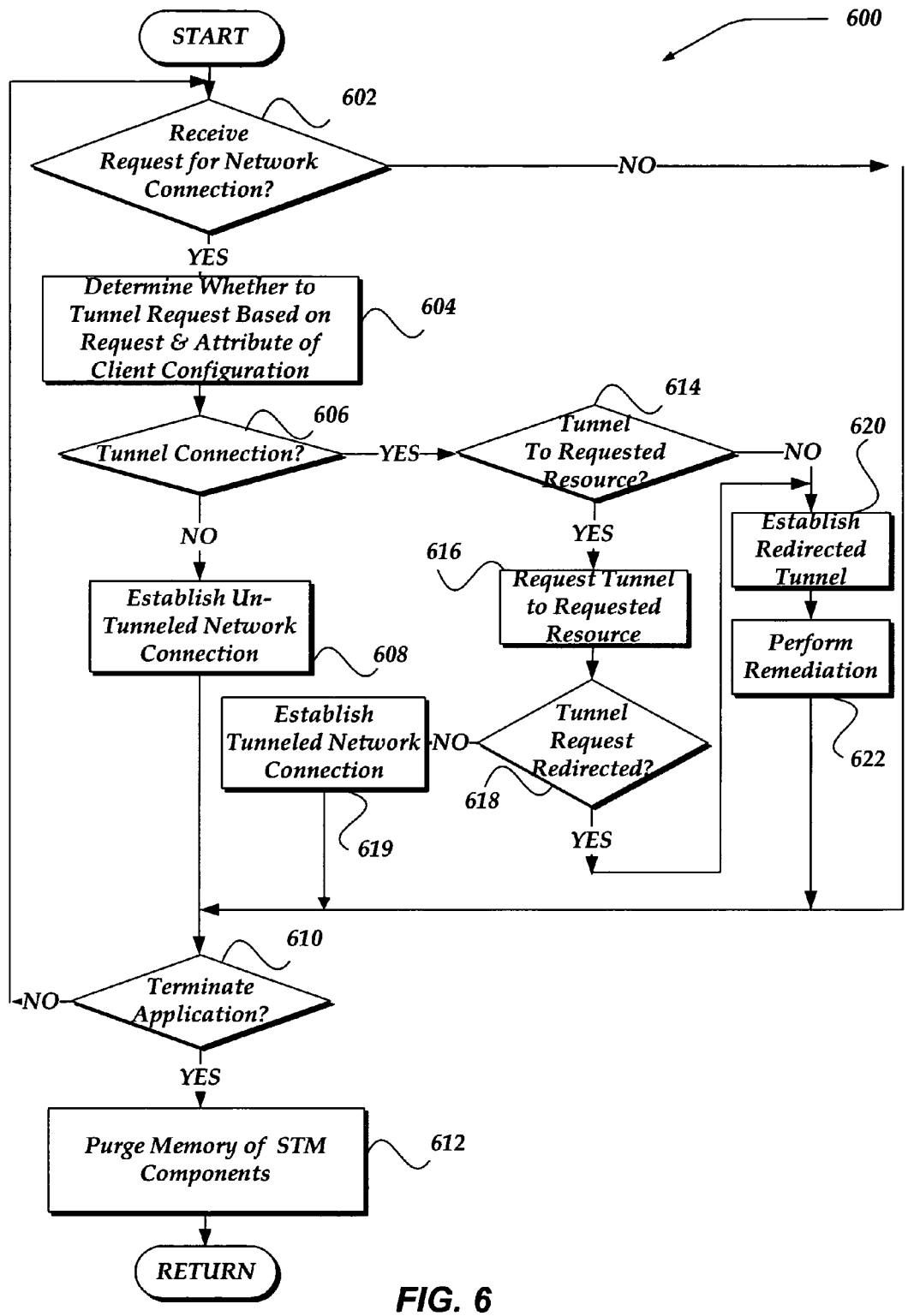
FIG. 6 illustrates a logical flow diagram generally showing one embodiment of a process of employing the modified STM components to selectively tunnel a network request by the client device.

FIG. 6 illustrates a logical flow diagram generally showing one embodiment of a process of employing the modified STM components to selectively tunnel a network request by the client device. In one embodiment, process 600 of FIG. 6 may be implemented within client device 102 of FIG. 1. However, the invention is not so limited. For example, at least some of process 600 may also be managed through actions performed by TMD 108 of FIG. 1.

Process 600 begins, after a start block, at decision block where a determination is made whether a request for a network connection is received. In one embodiment, the request includes a network address, such as an IP address, a TCP port number, or the like. In one embodiment, information may be obtained associated with the request including a resource being requests, such as a file, application, or the like; an application that is requesting the network connection; a domain name associated with the requested network connection; or the like. In any event, if a request for a network connection is not received, processing branches to decision block 610; otherwise, processing flows to block 604.

At block 504, a determination is made whether to tunnel the network connection based on the request and at least one attribute of the client configuration. Determination of whether to tunnel the network connection based on the request may include but not be limited to such request characteristics as an IP address, a TCP port number, a Domain Name, an application requesting the network connection, a file being requested, a network resource location, a network resource type being requested, or the like. Determination of whether to tunnel the network connection based on the at least one attribute of the client configuration includes whether the security level of the client device is below a threshold, whether the at least one attribute of the client device's configuration is below a threshold, or any of a variety of other client configuration attributes. The determination of whether to tunnel the network connection may combine the request determination and the client configuration determination. For example, in one embodiment, the security level of the client device may be determined to be below a threshold based in part on the at least one attribute of the client's configuration, but the request may be to a non-secure resource. In this example, although a tunnel may not be warranted, a tunnel might still be employed. The tunnel may be employed in this example, to protect data transferred over the connection. In any event, processing flows next to decision block 606, where based on the determination at block 604, a determination is made whether the connection is to be tunneled. If so, processing flows to decision block 614; otherwise, processing flows to block 608, where the requested network connection is established as an un-tunneled connection. Processing then proceeds to decision block 610.

At decision block 614, a determination is made whether to tunnel the network connection to the requested resource. For example, in one embodiment, a tunnel connection may be desired, however, it may be determined that the request is to be redirected to a different resource. This may arise, for example, where it is determined that the client device's security level is below a threshold. In that instance, the client device may be redirected to another resource, such as a security enhancing resource. Moreover, in one embodiment, access to another resource may be denied, or otherwise restricted. In any event, if the request is to be redirected, processing flows block 620; otherwise, processing flows to block 616, where the request to tunnel the connection to the requested resource is sent over the network. In one embodiment, the request may be sent to a device, such as TMD 108 of FIG. 1, where the device may make a further determination as to whether to allow access to the requested resource. In one embodiment, this determination is made external to the client device, thus increasing a level of security to network resources. Thus, process 600 flows to decision block 618, where a determination is made whether the request is redirected by the other device. If the client's request is redirected, processing branches to block 620; otherwise, processing flows to block 619.

At block 620, a connection is established to the redirected resource. In one embodiment, the redirection may include establishing a tunneled connection. Processing the proceeds to block 622, where remediation of the client's configuration may be performed. In one embodiment, a security enhancing resource, such as a server, application, or the like, may be employed to provide changes to the client's configuration that are directed towards improving the client's security level. In addition, at block 622 the client device may be restricted from accessing some resources. Upon completion of block 622, processing flows to decision block 610.

At block 619, a tunnel is established to the requested resource. In one embodiment, the tunnel is established as an SSL VPN; however, the invention is not so limited, and other tunneling mechanisms may be employed including, but not limited to SSL/TLS, Point-to-Point Tunneling Protocol (PPTP), Layer 2 Tunneling Protocol (L2TP), Layer 2 Forwarding (L2F), IP SECurity (IPSec) VPNs, or the like. Processing then flows to decision block 610.

At decision block 610, a determination is made whether the application associated with the network connection is terminated. If the application is not terminated, processing loops back to decision block 602; otherwise, processing flows to block 612 where memory may be purged of the STM components. Processing then returns to a calling process to perform other actions.

Figure 7:
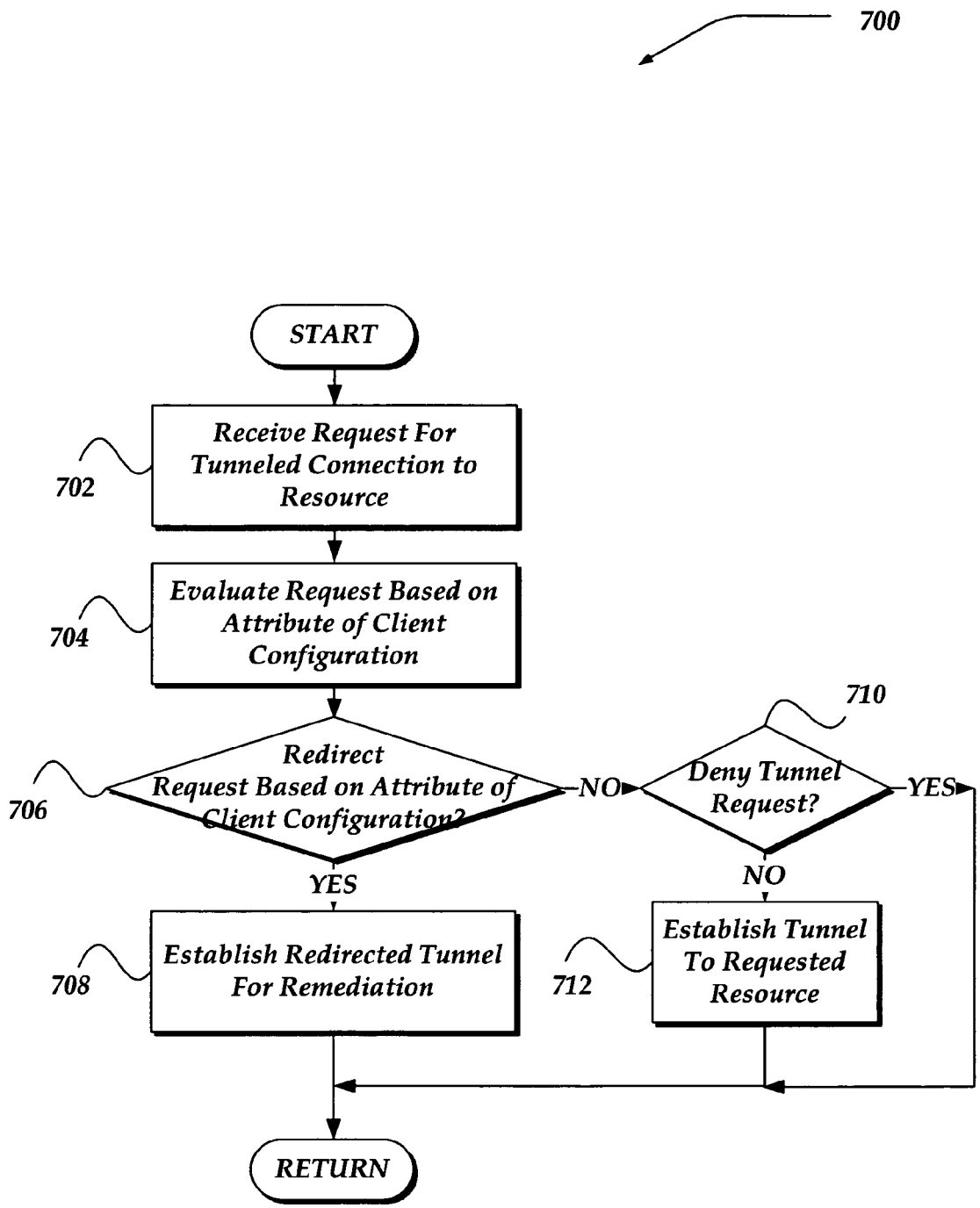
FIG. 7 illustrates a logical flow diagram generally showing one embodiment of a process of managing network requests by a server device based in part on a client configuration and the request, in accordance with the invention.

FIG. 7 illustrates a logical flow diagram generally showing one embodiment of a process of managing network requests by a server device based in part on a client configuration and the request. Process 700 of FIG. 7 may be performed within TMD 108 of FIG. 1, for example.

Process 700 begins, after a start block, at block 702, where a request is received for a tunneled connection to a resource. In one embodiment, the request may be received from a client device that includes STM components that selectively tunnel network requests; however, the invention is not so limited.

Processing proceeds next to block 704, where an evaluation of the request based on the at least one attribute of the client's configuration is performed. In one embodiment, where the request is from a client device that the at least one attribute of the client's configuration is currently available, an additional action may be performed to determine the client's configuration. In one embodiment, such actions may be substantially similar to those described above in conjunction with block 504 of FIG. 5. Processing then continues to decision block 706, where a determination is made whether to redirect the request based on the at least one attribute of the client's configuration. If the request is to be redirected, processing flows to block 708, where a redirected tunnel may be established. In one embodiment, the redirection is directed towards enabling remediation of the client's configuration. Processing then returns to a calling process to perform other actions.

If, at decision block 706, redirection is not to occur, processing flows to decision block 710, where a determination is made whether to deny the request to tunnel the connection to a resource. In one embodiment, denial may arise, because redirection and/or remediation is not feasible, because the at least one attribute of the detected client configuration indicates that the client is not authorized access to the resource, or any of a variety of other reasons. In any event, if the request is denied, processing returns to the calling process to perform other actions. Otherwise, processing flows to block 712, where a tunnel is established to the requested resource. Processing then returns to the calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device for managing a network connection, comprising:

a transceiver to send and receive data over the network; and
a processor that is operative to perform actions, including:
  receiving a request for a network connection from a client device;
  downloading onto the client device a component that detects a configuration of the client device and provides the detected configuration to the network device;
  modifying a Selective Tunneling Management (STM) component based in part on at least one attribute of the detected configuration of the client device, to include at least one test that employs the at least one attribute;
  downloading at least the modified STM component to the client device such that at least the modified STM component is enabled to selectively establish a tunneled network connection, an un-tunneled connection, or to redirect the request based on at least one characteristic of the request, a result of the at least one test, and the at least one attribute of the detected configuration of the client device, and wherein downloading the modified STM component further comprises detecting at least one other application or Application Programming Interface (API) capable of requesting a network connection other than the STM and when detected replacing in memory of the client device the at least one application or API with the modified STM component, and wherein selectively establishing the tunneled network connection further comprises if the detected configuration of the client device indicates a level of security below a threshold then establishing the tunneled network connection to a security enhancing resource while restricting access to at least one other resource; and
  when the modified STM component is terminated, purging the client device of at least the modified STM component.

2. The network device of claim 1, wherein the STM component further comprises at least one of a network API component, a tunnel manager, or an application component.

3. The network device of claim 1, wherein the STM component further comprises at least one of a sockets API component.

4. The network device of claim 1, wherein selectively establishing the tunneled network connection further comprises establishing an SSL VPN.

5. The network device of claim 1, the actions further comprising:
  employing the at least one attribute of the detected client configuration to determine whether to at least one of establish the tunneled network connection, deny the request, or redirect the request for remediation.

6. The network device of claim 1, wherein detecting a configuration of the client device further comprises downloading a component to the client device.

7. The network device of claim 1, wherein the request further comprises at least one of an IP address, a TCP port number, a Domain Name, an application requesting the network connection, a file being requested, a network resource location, or the network resource type being requested.

8. The network device of claim 1, wherein downloading at least the modified STM component to the client device further comprises:
  performing an examination of the client device to detect an other application than the STM capable of initiating a network request, and when the other application is detected, modifying the other application with at least some of the modified STM.

9. A method for managing a network tunnel over a network, comprising:
  receiving at a network device a request for a network resource from a client device;
  downloading onto the client device a component that detects a configuration of the client device and provides the detected configuration to the network device;
  modifying a Selective Tunneling Management (STM) component based in part on at least one attribute of the detected configuration of the client device, to include at least one test that employs the at least one attribute;
  downloading the modified STM component to the client device such that the modified STM component is enabled to selectively establish a tunneled network connection, an un-tunneled connection, or to redirect the request based on at least one characteristic of the request, a result of the at least one test, and the at least one attribute of the detected configuration of the client device, and wherein downloading the modified STM component further comprises detecting at least one other application or Application Programming Interface (API) capable of requesting a network connection other than the STM and when detected replacing in memory of the client device the at least one application or API with the modified STM component, and wherein selectively establishing the tunneled network connection further comprises if the detected configuration of the client device indicates a level of security below a threshold then establishing the tunneled network connection to a security enhancing resource while restricting access to at least one other resource; and
  when it is determined that the modified STM component is terminated on the client device, the network device purging the client device of at least the modified STM component.

10. The method of claim 9, wherein selectively establishing the tunneled network connection further comprises if the requested resource is protected by a security perimeter, employing a tunnel through the security perimeter.

11. The method of claim 9, wherein selectively establishing the tunneled network connection further comprises if the requested resource is identified in a list of resources for tunneling, and the client configuration is above a threshold, establishing the tunneled network connection to the network resource.

12. The method of claim 9, further comprising:
  if the request is to a resource unprotected by a predetermined security perimeter, sharing at least one of a client configuration, a credential, or a certificate, with the resource.

13. The method of claim 9, wherein selectively establishing the tunneled network connection further comprises:
  if the detected client configuration is below the threshold, further redirecting the request for remediation.

14. The method of claim 9, wherein the at least one attribute of the client configuration further comprises at least one of information indicating which applications are residing on the client device, a configuration of an application on the client device, an operating system configuration, a software patch level, a certificate type, an encryption capability, a security product status, a management mechanism associated with the client device, or a type of client device.

15. A non-transitory computer readable storage medium configured to include program instructions for performing the method of claim 9.

16. A network device for managing a network connection, comprising:

a transceiver to send and receive data over the network; and
a processor that is operative to perform actions, including:
- receiving a request for a network connection from a client device;
- downloading onto the client device a component that detects a configuration of the client device including information indicating whether the client device is a kiosk or is otherwise not managed by a defined business and provides such detected configuration to the network device;
- selecting a pre-modified Selective Tunneling Management (STM) component based in part on at least one attribute of the detected configuration of the client device including whether the client device is a kiosk or otherwise not managed by a defined business, wherein the pre-modified STM component includes at least one test that employs the at least one attribute;
- downloading at least the selected STM component to the client device such that at least the selected STM component is enabled to selectively establish a tunneled network connection, an un-tunneled connection, or to redirect the request based on at least one characteristic of the request, a result of the at least one test, and the at least one attribute of the detected configuration of the client device, and wherein downloading the modified STM component further comprises detecting at least one other application or Application Programming Interface (API) capable of requesting a network connection other than the STM and when detected replacing in memory of the client device the at least one application or API with the modified STM component, and wherein selectively establishing the tunneled network connection further comprises if the detected configuration of the client device indicates a level of security below a threshold then establishing the tunneled network connection to a security enhancing resource while restricting access to at least one other resource; and
- when the modified STM component is terminated, purging the client device of at least the modified STM component by the network device.

17. The network device of claim 16, wherein the pre-modified STM component is pre-modified based on an expected client configuration.

18. The network device of claim 16, wherein selecting the pre-modified STM component further comprises selecting the pre-modified STM component that is pre-modified based on an expected at least one attribute that most closely matches the at least one attribute of the detected client configuration.

19. The network device of claim 16, the actions further comprising:
- modifying the pre-modified STM component based in part on the at least one attribute of the detected configuration.

20. An apparatus useable in managing network connections over a network, comprising:
- at least one processor that is operative to provide a component to a client device to detect a configuration of client device and to provide the detected configuration to the apparatus; and
- wherein the at least one processor is operative to perform actions, including:
- providing to the client device at least one component that is dynamically modified prior to providing to the client device based on the detected configuration of the client device, and to include at least one test for at least one attribute of the detected configuration;
- enabling the client device to selectively tunnel a network connection, an un-tunneled connection, or to redirect the request based in part on at least one characteristic of a network request, a result of the at least one test, and at least one attribute of the client configuration, and wherein providing the modified component further comprises detecting at least one other application or Application Programming Interface (API) capable of requesting a network connection other than the modified component and when detected replacing in memory of the client device the at least one application or API with the modified component, and wherein selectively establishing the tunneled network connection further comprises if the detected configuration of the client device indicates a level of security below a threshold then establishing the tunneled network connection to a security enhancing resource while restricting access to at least one other resource; and
- operating on the apparatus for purging the client device of the at least one component when it is determined that the at least one component is terminated.

21. The apparatus of claim 20, wherein the at least one processor is operative to perform actions, including:
- receiving the network request; and
- if a security level of the client device is below the threshold, further redirecting the network request for remediation.

22. The apparatus of claim 20, wherein the at least one attribute comprises a security level associated with the client.

* * * * *